United States Patent
Keehn, Jr

(10) Patent No.: US 6,773,316 B1
(45) Date of Patent: Aug. 10, 2004

(54) NON-VENTILATING AFT THRUSTER TUNNEL DESIGN

(75) Inventor: Douglas A. Keehn, Jr, Merritt Island, FL (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/062,354

(22) Filed: Jan. 31, 2002

(51) Int. Cl.[7] ................................................ B63H 5/16
(52) U.S. Cl. ........................... 440/68; 114/151; 440/38
(58) Field of Search .................................. 114/151, 290, 114/291; 440/38, 40, 68

(56) References Cited

U.S. PATENT DOCUMENTS

| | | |
|---|---|---|
| 1,726,962 A | * 9/1929 | May .............................. 440/40 |
| 1,843,574 A | 2/1932 | May |
| 4,231,314 A | 11/1980 | Peters |
| 4,843,988 A | 7/1989 | Clement |
| 4,903,626 A | 2/1990 | Haines |
| 5,090,929 A | 2/1992 | Rieben |
| 5,679,037 A | 10/1997 | Rieben |

* cited by examiner

Primary Examiner—Sherman Basinger
(74) Attorney, Agent, or Firm—Malin, Haley & DiMaggio, P.A.

(57) ABSTRACT

A modified boat hull, providing for dual, non-ventilating aft thruster tunnels. Each tunnel includes a generally tubular section which fluidly communicates with the transom outlet orifice, and a converging transition section which communicates at the extreme opposite end with a water inlet orifice which is positioned within an enhanced, vertical strake surface. The vertical strake surface is located beneath the chine of the boat, as well as beneath the water line. The modified hull also includes an inboard offset for the vertical strake surface, and a chine step to enhance hydrodynamic performance of the hull when attempting to achieve or exceed plane speed.

13 Claims, 9 Drawing Sheets

DIRECTION FOR
SECTIONAL VIEW 9A

CL OF TUBE

INTAKE OPENTING
PROJECTED TO SIDE VIEW

NON-VENTILATING AFT THRUSTER TUNNEL DESIGN

BACKGROUND OF THE INVENTION

1. Field of the Invention

The present invention relates to boat hull designs, and more particularly a modified boat hull, which provides non-ventilating, dual aft thruster tunnels, which are completely submerged within a body of water when the boat is either stationary or moving at slow speeds, below plane speed.

2. Description of Related Art

Marine vehicle designs have included hulls which incorporate both fore and aft thrusters mounted within specifically designed housings or water channels. However, the housing inlets which are immersed within and receive water when the thruster is activated in a forward direction, thereby providing thrust from the transom, experience problems with ventilation of the channel due to the presence or ingestion of atmospheric air within the housing. This is because the conventional designs place the channel inlet, or opening which provides water access, above the water line of the boat hull, for example on the chine. A chine orifice which is in such close proximity to the water line, and generally above same, allows a substantial and undesired volume of air to be present in the channel when the thrusters are activated. Ventilation is extremely undesirable, as it results in a substantial reduction in power produced by thrusters, vibration of the motors, mechanical assemblies, and support structures, as well as increased noise.

Although prior designs have sought to improve the handling and maneuverability of boats in general, existing designs have failed to adequately address the problems and phenomena of ventilation when the boat is operating at low speeds. This is particularly true with vessels having wide beams, concomitant enhanced flotation and less chine submergence. This increases ventilation with respect to openings above the chine, which thereby increases the undesirable effects described above.

The prior art reveals a number of attempts directed toward increasing the maneuverability of marine vessels, including certain designs incorporating two or more aft thrusters. For example, U.S. Pat. No. 5,090,929 issued to Rieben, discloses a PAIRED MOTOR SYSTEM FOR SMALL BOAT PROPULSION AND STEERAGE. Rieben discloses a boat hull defining paired cylindrical bodies which house motors and propellers, and provide water channels therein. Rieben teaches of forward orifices which are located on the sides of the boat, providing water access. However, Rieben fails to appreciate or address the problems associated with the instant invention, in that the orifices are located above the chine line, thereby creating the ventilation and undesirable phenomena sought to be avoided.

U.S. Pat. No. 5,679,037 issued to Rieben discloses a STATIONARY SCREW INDUCTION SYSTEM. Rieben '037 discloses a specific system for improving performance of a watercraft, such as a canoe, and incorporates a cylindrical housing, with a helical-shaped induction channel to provide a specific form of increased propulsion. Rieben '037, however, does not address, nor was concerned with, the problems eliminated by the instant invention.

U.S. Pat. No. 4,843,988 issued to Clement discloses a STEPPED BOTTOM FOR BOAT. Clement teaches of a boat hull design incorporating stepped regions, substantially reducing the wetted bottom area of the boat, to eliminate unwanted frictional drag. Clement also discloses vent pipes through the hull of the boat, intended to introduce air flow to hull regions, thereby teaching away from the instant invention.

As has been described, the prior art does not address, or overcome, the aforementioned problems with thruster tunnel ventilation. Thus, there still exists a need for a modified hull design which eliminates the introduction or presence of air within aft tunnels when the vessel is operating at below plane speeds. A hull design is desired which increases the efficiency of the thrusters, and associated power output, by completely submerging the tunnels below the water line, and at the same time allowing for operational efficiency and maximizing hydrodynamic forces when the boat is accelerating, attempting to reach plane or exceeding plane speeds while cruising.

Accordingly, what is needed in the art is an improved hull design, providing for superior vessel performance, which eliminates ventilation within aft thruster tunnels, yet does not impede general performance of the boat when operating at relatively high speeds, for example, cruising. It is, therefore, to the effective resolution of the aforementioned problems and shortcomings of the prior art that the present invention is directed. However, in view of the boat and watercraft designs in existence at the time the present invention was completed, it was not obvious to those persons of ordinary skill in the pertinent art and marine industry as to how the identified needs could be fulfilled.

BRIEF SUMMARY OF THE INVENTION

The present invention contemplates an improved and modified boat hull that appropriates a design providing non-ventilating aft thruster tunnels. The tunnels are generally located on angles, for example between 35–40 degrees from the vessel keel. The hull incorporates a pair of such thruster tunnels, each of which extends from a strake orifice or water inlet opening located on the side of the hull, to a transom orifice or water outlet located at the opposing end of the tunnel. The strake opening is of a unique design, and is located beneath the chine, such that it is below the surface of the water.

The modified hull includes a strake step, or offset, from the side of the hull inboard, toward the keel line. The vertical face of the strake is extended to provide an efficient water inlet orifice, as well as to be compatible with the chine interface.

The novel hull also includes a chine step, which is a vertical offset from the chine line. The chine step then tapers angularly, and rearwardly, and ultimately terminates in close proximity from the transom. The upper planar surface of the chine step extends inboard from the chine line, and intersects with the vertical strake surface.

The instant design can also include a chine wedge, which constitutes a hook surface on the side of the vessel. The chine wedge provides a gradually flared surface, just preceding the chine step, which eliminates unwanted water spray from entering the strake orifice while cruising.

The modified hull includes a pair of symmetrical, opposing tubular tunnels located in the aft section of the vessel. Each said tunnel includes a generally cylindrical or tubular section which terminates at one end at the transom orifice. Each tunnel also includes a converging transition segment which terminates at the vertical strake surface, as described above.

The above-described design and specifications provides aft thruster tunnels which are completely submerged within a body of water when the vessel is either stationary or, alternatively, moving at slow speeds, when the boat is not on plane. The tunnels are thus filled only with water, thereby avoiding the presence or introduction of atmospheric air. This provides the optimum environment and conditions for operating the aft motors supported within the tunnels, providing optimum power and propulsion for precision handling of the watercraft. This design greatly enhances operator control of the vessel, for example, when docking the boat in close quarters, maneuvering in strong currents or through other boats in congested waterways, maneuvering the craft in conditions requiring quick and accurate navigation, as well as fishing and scuba diving activities.

Additionally, the design, while optimal at below plane speeds, must also be compatible with the general operation and performance of the boat when accelerating or cruising. The design does not negatively affect, or detract from, the operation of the boat when either achieving plane or operating at relatively high speeds. Once the boat achieves plane, the extended vertical strake face, operating in conjunction with the chine step, operates in a reverse fashion, to actually facilitate the introduction of air into the tunnels. At such speeds, it is desirable to eliminate the presence of water within the tunnels, which likewise eliminates unwanted hydrodynamic forces and frictional drag acting upon the boat and impeding speed. As the boat accelerates, the conventional portion of the hull design, including planing strakes, provides lift through the application of the hydrodynamic forces. The planing strakes control the lift of the vessel, which is created by the water flow when the hull is in motion. Conventional hull design changes the direction of the water flow through the use of chine sections and planar portions strategically placed about the hull. In cruising conditions, it is advantageous to eliminate as much primary resistance as possible, through minimization of frictional drag, which includes eliminating any drag caused by water being present, or flowing through, the described tunnels while cruising.

In accordance with the instant invention, it is an object thereof to provide an improved boat hull design which eliminates ventilation within aft thruster tunnels when the vessel is operating at below plane speeds.

It is a further object of the instant invention to provide a marine vessel hull design which minimizes frictional drag resistance in or about the thruster tunnels when the vessel is operating at relatively high speeds, above plane.

It is a further object of the instant invention to provide a modified hull design which does not interfere with, or impede, the boat's performance when accelerating.

It is a further object of the instant invention to provide modified hull design which is cost-effective and operationally efficient.

Still another object of the present invention is to provide a modified hull design which is compatible with precision handling of the vessel, superior and extremely accurate navigational systems, including mechanical and electrical control equipment and propulsion units, for optimal operator control and vessel performance.

A further object of the present invention is to provide a modified marine vessel hull which includes all of the above-mentioned features and objects to provide a superior design, eliminating undesirable ventilation phenomena and optimizing hydrodynamic forces in particular conditions.

These and other important objects, advantages, and features of this invention will become clear as this description proceeds hereinafter. The invention accordingly comprises the features of construction, engineering designs and components, the interrelationship thereto, combination of elements, and arrangement of parts that will be exemplified in the description set forth hereinafter, and the scope of the invention will be indicated in the claims.

In accordance with these and other objects which will become apparent hereinafter, the instant invention will now be described with particular reference to the accompanying drawings.

DETAILED DESCRIPTION OF THE PREFERRED EMBODIMENTS

Figure 1:
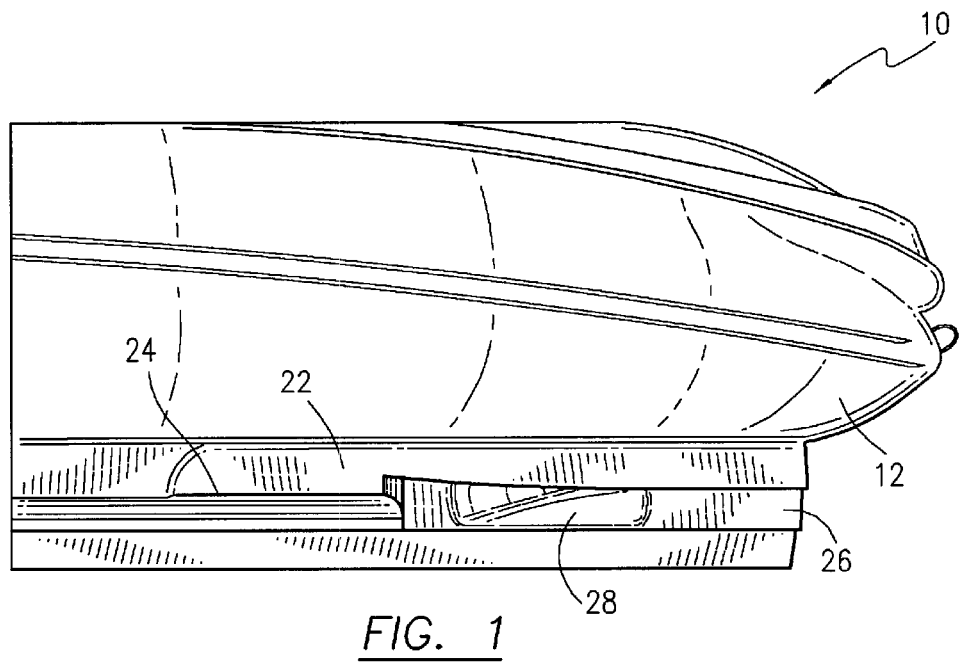
FIG. 1 is a left side view of the aft section of a hull incorporating instant invention.

Turning to FIG. 1, a modified boat hull 10 is shown, depicting the instant invention. FIG. 1 illustrates a side view of the rear section of a boat, which generally includes upper hull section 12.

For purposes of this disclosure, hulls are generally constructed or can be generally constructed utilizing fiberglass technology, integral composite stringer systems, high performance vinyl ester resins, composite materials including polypropylene and polyethylene components, gel coats and the like. The instant invention can be practiced, and incorporated into hulls, utilizing any such known materials and construction methods.

Figure 14:
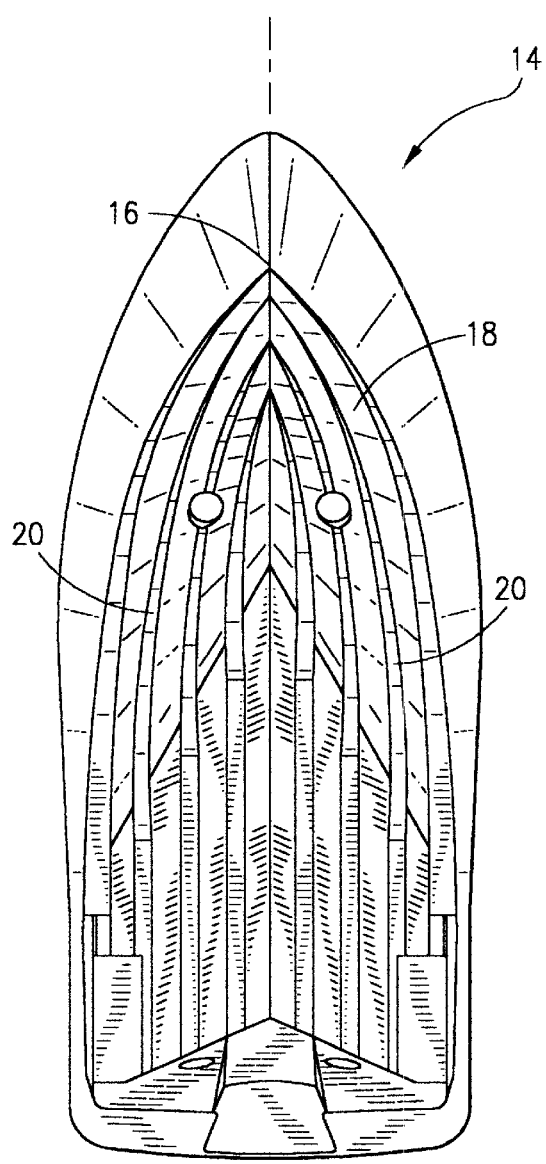
FIG. 14 is a bottom view, illustrating the underside of a modified hull according the instant invention.
Figure 16:
FIG. 16 is a side view, illustrating the right side of a hull incorporating the instant invention.

With reference to FIG. 14, a boat hull 14 is shown, depicting the underside of the hull. As is well known in the marine industry, many boat hulls include a V-shaped bottom section, as illustrated in FIG. 14, as well as in a side view set forth in FIG. 16. Conventional hulls include deep Vs, as well as semi V-shaped hulls having a decreased slope to the sides of the hull. FIG. 14 illustrates centerline 16 which runs along the keel of the vessel. The generally V-shaped hull 18 includes strakes 20 which are generally parallel to one another and run along the periphery of the boat hull to provide lift for the vessel, as a result of the hydrodynamic forces which are created when the vessel is moving in a forward direction. Strakes 20 are often referred to as planing strakes, and include planar sections or portions which generally run horizontally and longitudinally along the boat hull.

Again with respect to FIG. 1, the left side, aft section of a boat is illustrated, including vertical chine surface 22 which defines lowermost chine line 24.

With respect to both FIG. 1 and FIG. 2, the modified hull includes vertical strake surface 26, which can be seen to be positioned below chine 22. Vertical strake surface 26 also defines an opening which is in fluid communication with inlet orifice 28 of the aft thruster tunnels.

Figure 12:
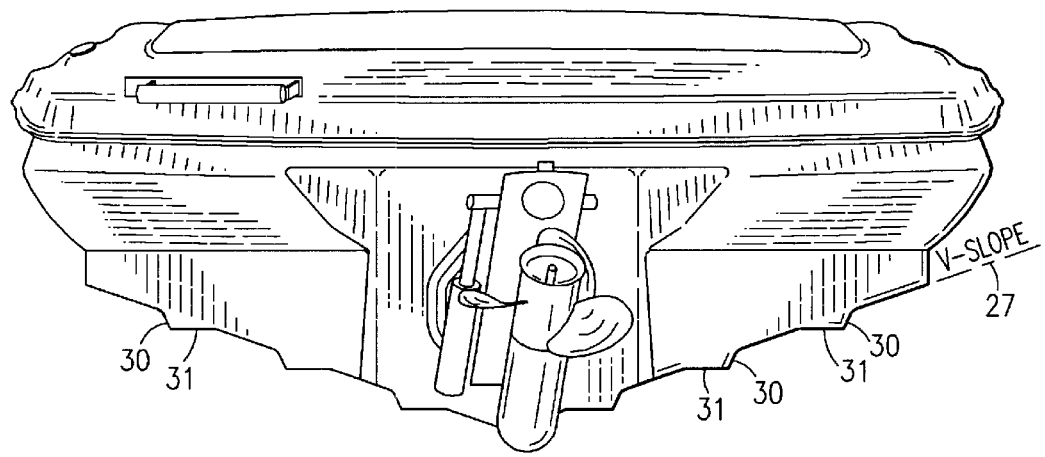
FIG. 12 is a rear view of a boat, illustrating a conventional hull, as known in the prior art.

For purposes of clarity, and with reference to FIG. 12, it is generally understood in the industry that a strake includes a generally vertical face 30, as well as a generally horizontal surface 31, neither of which surfaces coincide with the V-shaped slope 27 of the hull. Now with reference to FIG. 1, the vertical strake face 26 of the instant invention is substantially enlarged to accommodate the tunnel inlet, as well as otherwise modified at the aft section of the vessel, as further described in detail hereinafter.

Figure 2:
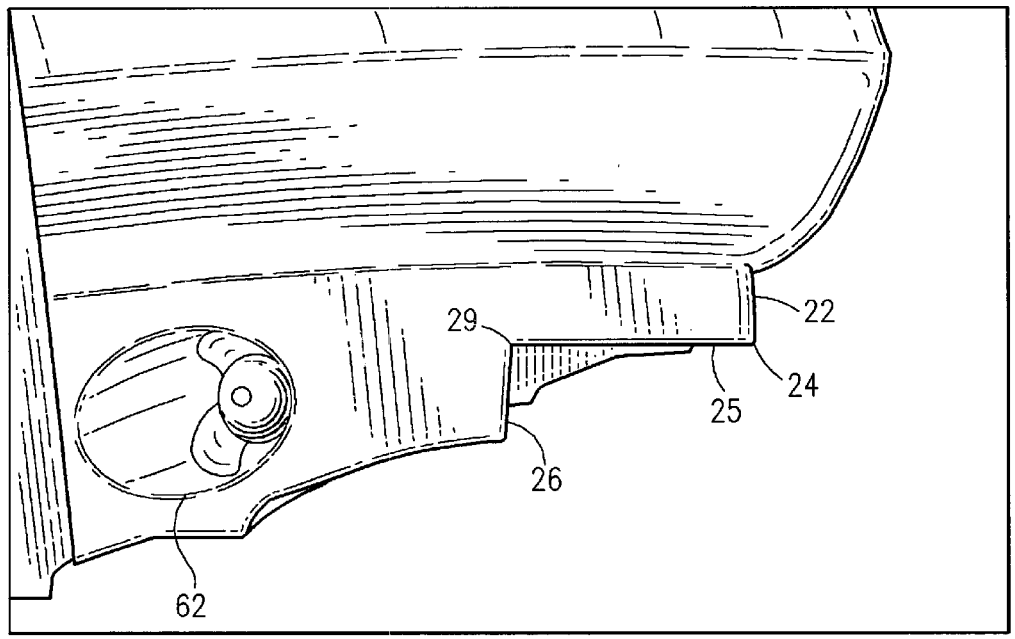
FIG. 2 is a partial rear view of a hull incorporating the instant invention, illustrating the right rear section of the boat hull.
Figure 6:
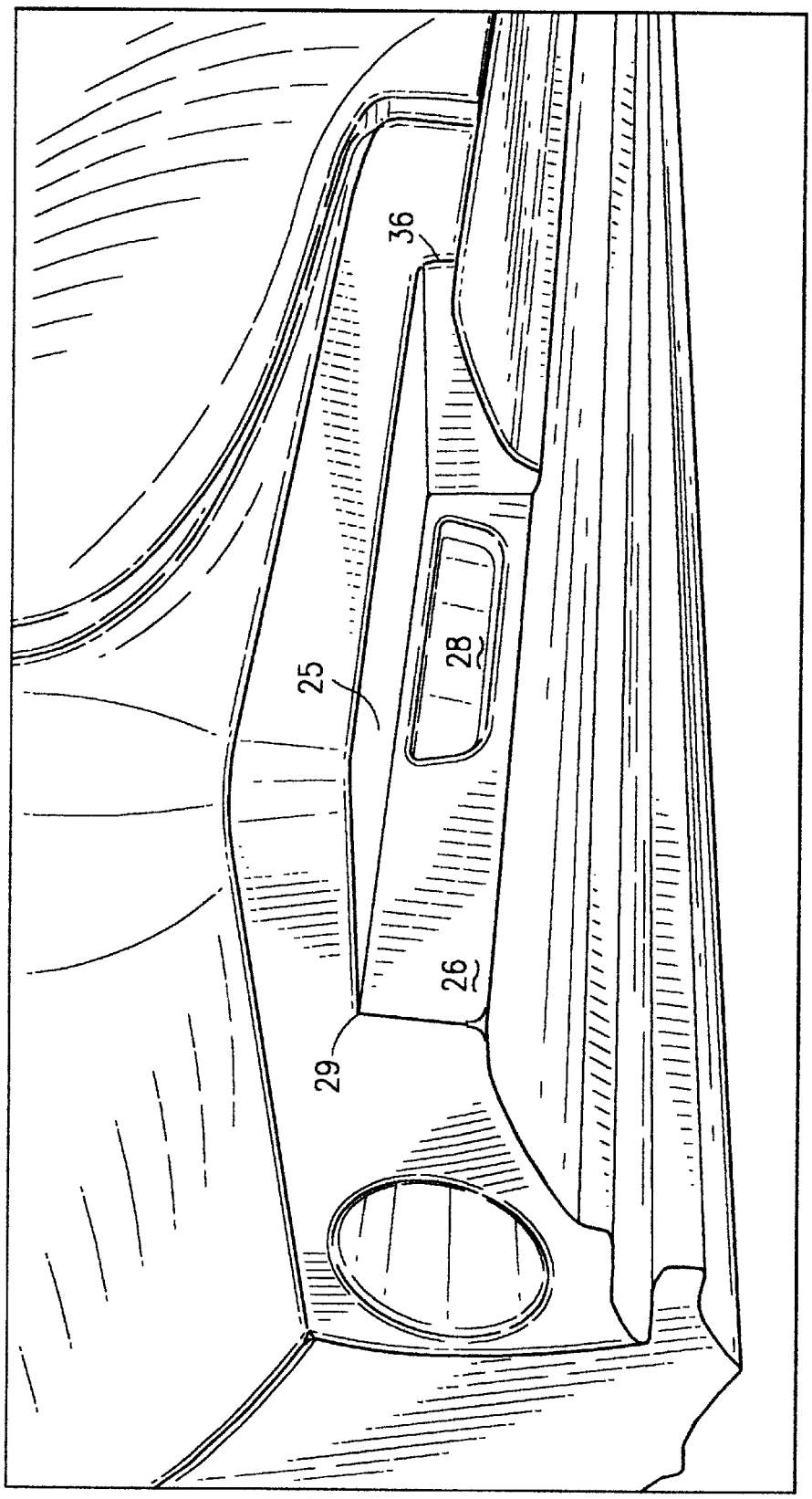
FIG. 6 is a partial, perspective view of the instant invention, illustrating the right aft section of a modified hull.

With reference to FIG. 2, it can be seen that the vertical strake face 26 is extended upwardly in the modified hull a substantial distance beyond that of a conventional strake surface. Similarly, the lower planar surface 25 of the chine is generally horizontal, and is extended inboard, toward the centerline of the hull, until it intersects with the vertical strake face at point 29. See also, for example, the perspective depiction as illustrated in FIG. 6. In a specific embodiment, vertical strake face 26 is approximately 3¾ inches in height, in proportion to a vessel which is approximately 21 feet long.

Figure 3:
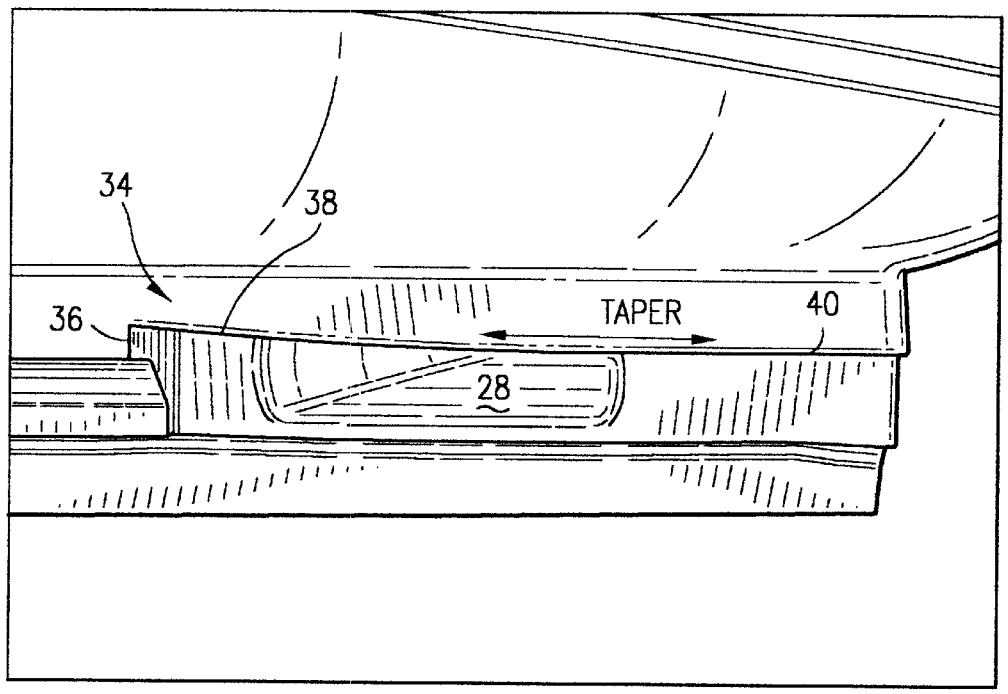
FIG. 3 is an enlarged view, emphasizing the structure depicted in FIG. 1.

With reference to FIG. 3, the instant invention incorporates chine step 34, which is comprised of vertical offset 36 from the lower chine line, and elongated chine taper 38. In a specific embodiment, vertical offset 36 is approximately 1¼ inch in height, and chine taper 38 slopes angularly and rearwardly, terminating approximately 4 inches from the transom at point 40. It can be seen that the chine step therefore includes a first vertical surface defined by vertical offset 36, as well as a second, angled planar surface 25 which tapers toward the rear of the boat, terminating just prior to the transom.

The chine step 34 provides the important function of allowing the boat to accelerate as quickly as possible and to achieve plane speed, while avoiding the unwanted influences of frictional drag which would be caused by water being present in, and flowing through, the thruster tunnels. Incorporating chine step 34, in conjunction with the increased vertical strake face height, the impeding effects of frictional resistance are eliminated. This is achieved by allowing air to begin to ventilate the thruster tunnels upon acceleration and forward movement of the boat. As this occurs, the chine step initially breaks through the surface of the water, and allows air to enter into the tunnel inlet orifice, at the chine step's most forward-oriented position. Therefore, only during acceleration, the chine step allows surface air to flow through the tubular tunnels to the low pressure end of the transom, thus displacing water rushing through the tunnels, and allowing the boat to achieve plane speed faster.

Chine vertical offset 36 is approximately 4 inches forward of the tunnel inlet orifice 28.

Figure 4:
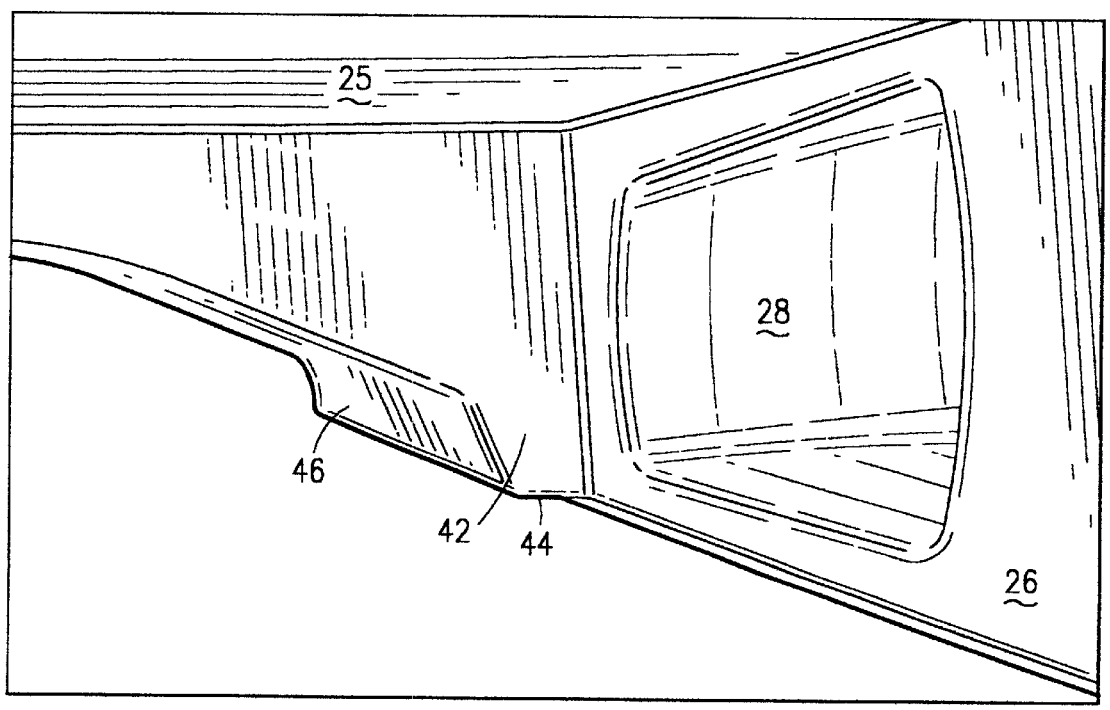
FIG. 4 is an enlarged, perspective view, emphasizing the structure depicted in FIG. 3.

With reference to FIG. 4, in an alternative embodiment, the modified hull includes strake step 42, which is an inboard offset, generally toward the hull centerline, and defined dimensionally at its lowermost offset by line 44. It can be seen that the strake step is inwardly positioned a significant distance from the unmodified small strake 46 which exists on a conventional hull. In a specific embodiment, strake offset 42 is ¾ inches wide, and terminates 4 inches forward of the tunnel inlet orifice 28. The purpose of the strake step is to eliminate unwanted water and spray from entering the tunnels and causing drag, after the boat has exceeded plane speed. By providing the vertical strake surface offset, the water and/or spray rushing about the sides of the hull shoot in a rearward direction, and in conjunction with the high speed, forward movement of the boat is propelled past the tunnel openings.

Figure 5:
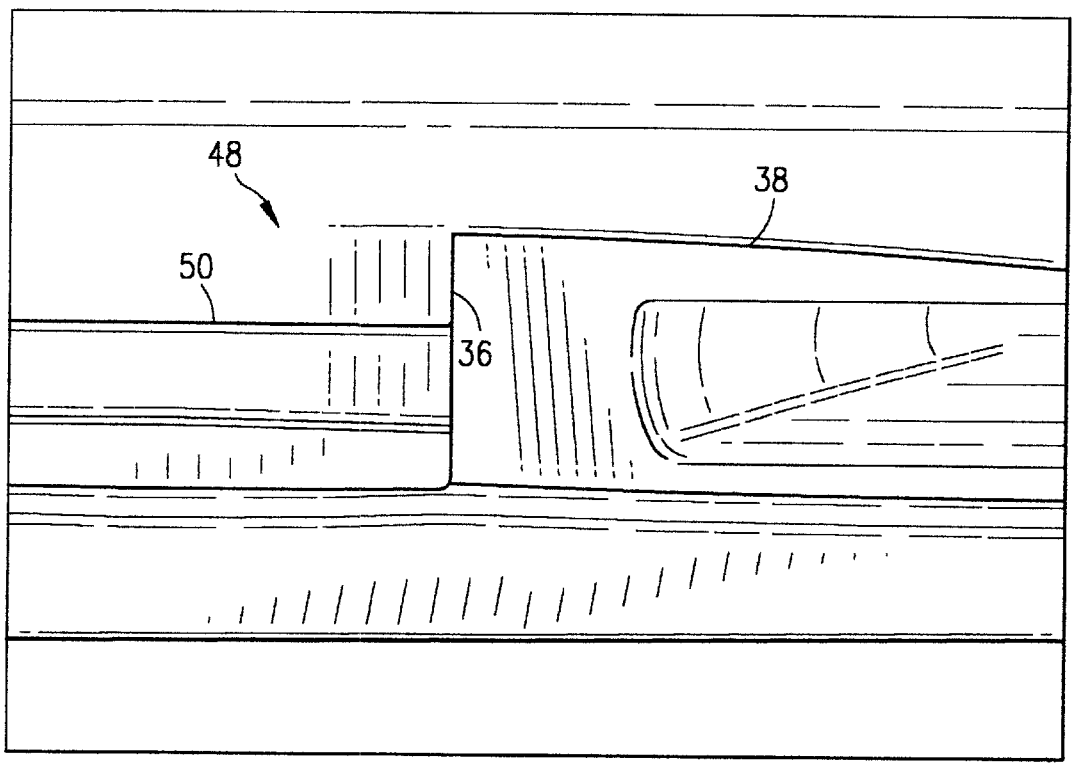
FIG. 5 is an enlarged, partial side view of the modified hull depicted in FIG. 3.

With reference to FIG. 5, an alternative, specific embodiment of the instant invention includes a chine wedge 48 which further reduces spray from entering the tunnel orifices. Chine wedge 48 is comprised of a hook surface, which gradually flares in an outward direction, away from the hull of the boat. An efficient design includes a chine wedge which begins approximately 6 inches forward of chine offset 36, at point 50. The flared surface can be approximately ½ inch to 1 inch thick at its most rearward position, and gradually decrease in thickness toward its termination point 50.

Figure 7:
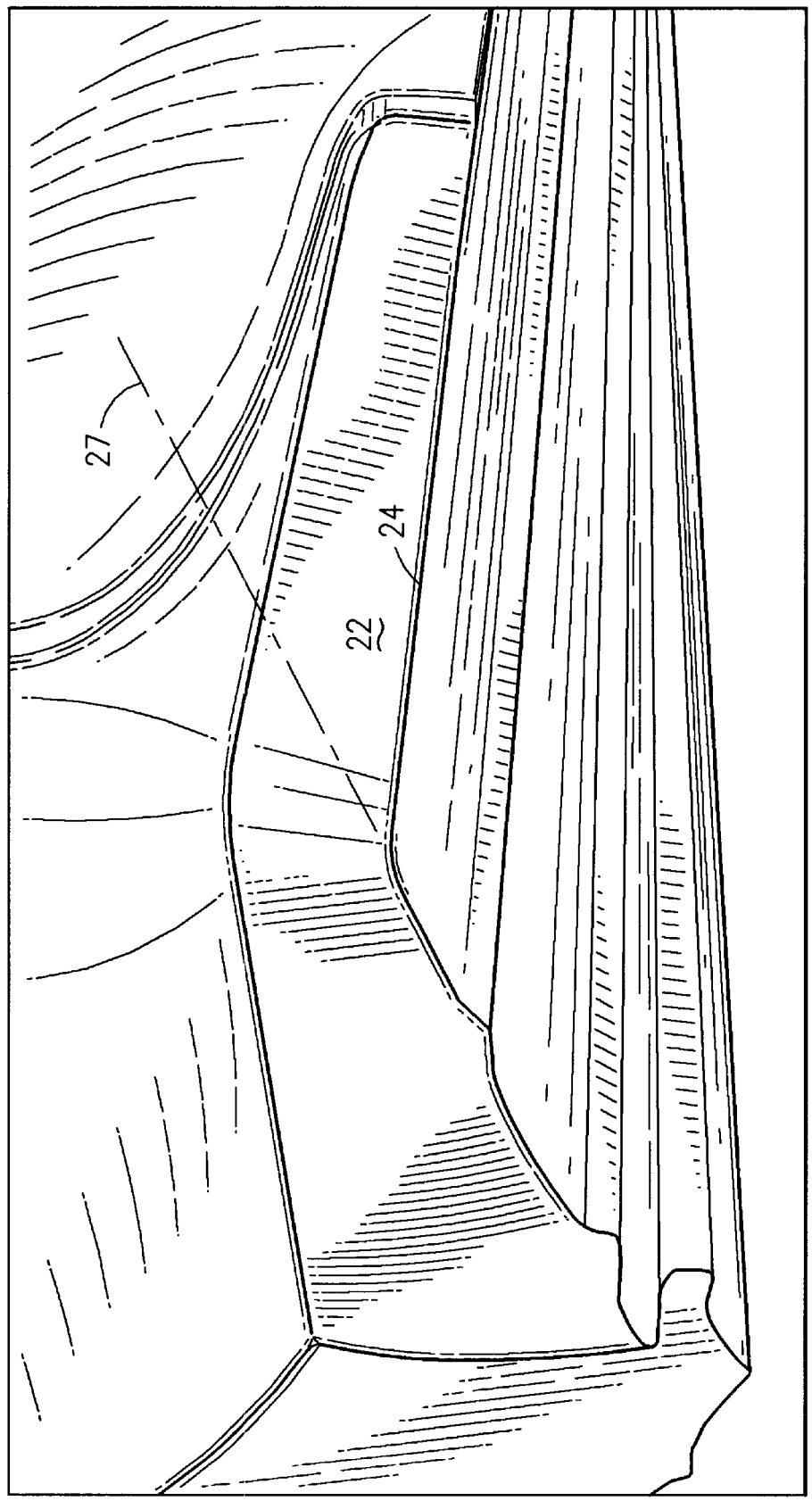
FIG. 7 is a partial, perspective view, illustrating the right aft section of a conventional boat hull, taught by the prior art.

FIG. 7 illustrates a conventional boat hull, of a generally V-shaped hull. Chine 22 is well-defined, as is the lowermost chine line 24. The slope of a typical V-shaped hull is illustrated by dotted line 27, as shown in both FIG. 7 and FIG. 12. Contrasting a conventional hull as depicted in FIG. 7 with a modified hull pursuant to the specification of the instant invention as shown in FIG. 6 effectively demonstrates the substantial structural changes which are required in order to provide the non-ventilating tunnel design. A generally rectangular volumetric section of the hull is in essence removed or cut away, with appropriate offsets of planar surfaces, in order to achieve the desired results and completely eliminate the negative effects of ventilation, cavitation, and decreased thrust.

Figure 8:
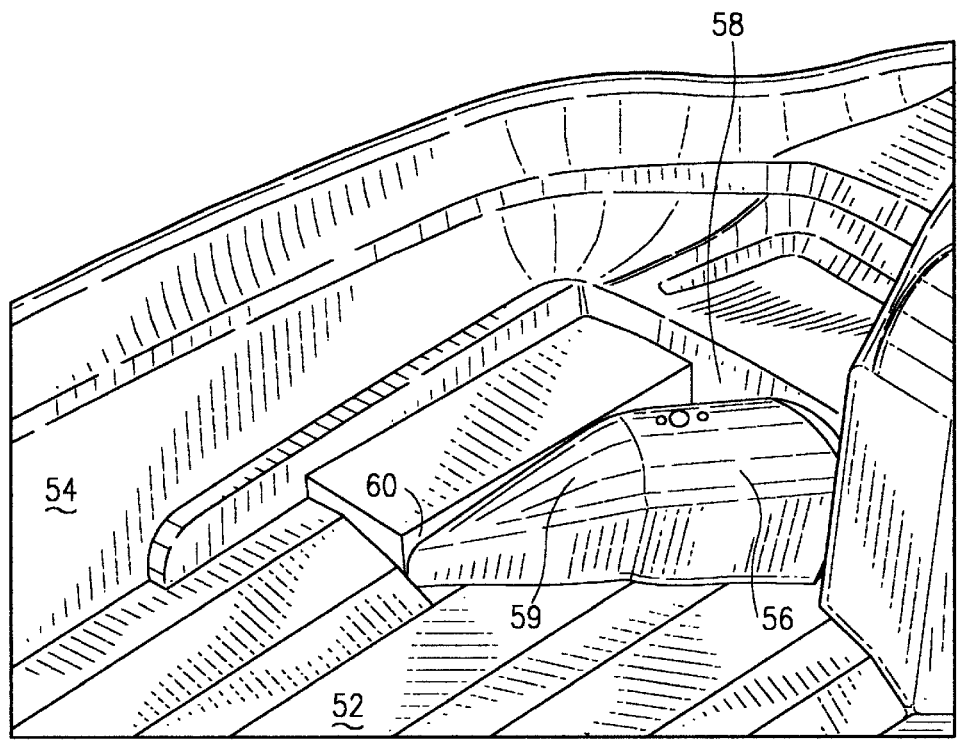
FIG. 8 is a partial, perspective top view, illustrating the right aft section of a modified hull incorporating the instant invention.

FIG. 8 depicts a partial perspective view of the tunnel design, taken from above the hull, and illustrating the right, aft section of the vessel. It is to be understood that the modified hull design described herein includes a pair of thruster tunnels, which are generally symmetrically positioned within the hull, each of which is angularly positioned 35 to 40 degrees from the centerline of the hull. FIG. 8 illustrates the inside 52 of the hull, having generally vertical sides 54. The invention includes tubular tunnel section 56 which terminates at one end of transom 58. The tubular tunnel means also includes converging transition section 59 which terminates at its most forward position at inside surface 60 of the vertical strake face. It is therefore appreciated that the tunnel means of the instant invention terminates at its most rearward position at transom orifice 62, shown clearly in FIGS. 2 and 13. The tunnel means terminates at its most forward position at the vertical strake face 26, and provides the tunnel inlet orifice 28.

Figure 9:
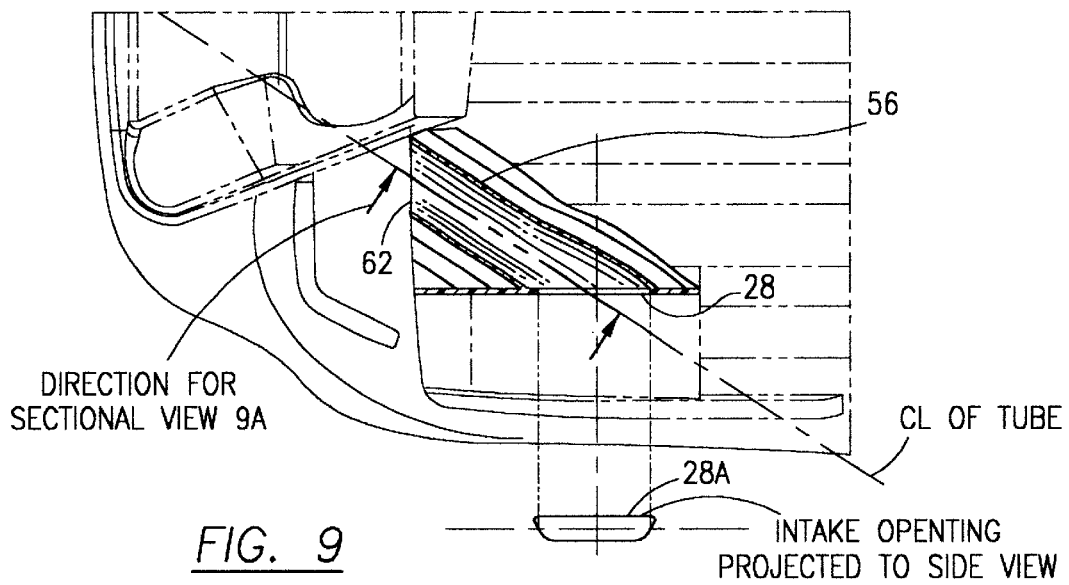
FIG. 9 is a partial, cross-sectional, top plan view, illustrating the right aft section of a modified hull incorporating the instant invention.

With reference to FIG. 9, the tubular tunnel section 56 is shown in cross-section, and depicts inlet orifice 28 and transom orifice 62. FIG. 9 also illustrates the inlet or intake opening 28A, as a projected side view, and its orientation with respect to the cross-section of the tunnel.

Figure 9A:
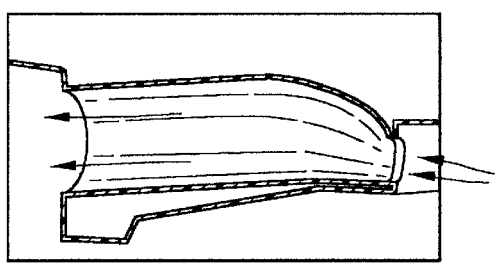
FIG. 9A is a vertical, cross-sectional view, taken on the line of direction for the sectional view, as illustrated in FIG. 9.

FIG. 9A is a cross-sectional, cut-away view taken along the directional section line set forth in FIG. 9. It is therefore realized that when the boat is moving in a forward direction, water enters the thruster tunnels from the opening in the vertical strake surface and completely fills the tunnel with water in and about the thruster propellers and associated mounting structure when the boat is either stationary or moving at slow speeds. Such conditions are achieved by locating the tunnel inlets substantially below the chine, such that the tunnels are completely submerged during low speed operations, and prevent surface air from ventilating the channels. The design is such that even in rough seas, with substantial wave action or surface chop, or while encountering heavy listing, the aft section of the boat and tunnel openings remain beneath the water line.

Figure 10:
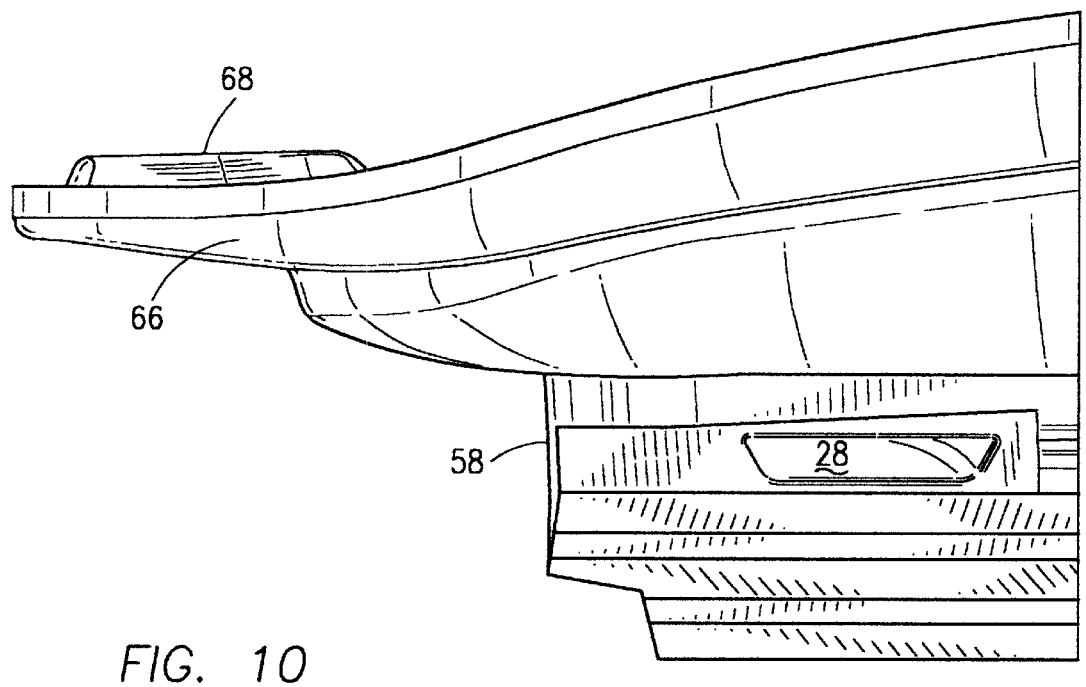
FIG. 10 is a partial, right side view, illustrating the aft section of a modified hull incorporating the instant invention.

FIG. 10 illustrates a partial right side view of the aft section of a modified hull according to the description herein. FIG. 10 depicts the tunnel inlet 28 in relation to the transom 58 and a particular upper hull structural design 66. This particular boat model includes a swim platform, 68 having attractive functional features, as well as stylish ornamental design features. FIG. 10 also illustrates that the most rearward portion of the boat deck can extend substantially beyond the boat's transom, which provides the water outlet for the thruster propellers. This has the additional benefit of positioning the outlets a significant distance away from a recreational swimmer, both when leaving or approaching the vessel.

Figure 11:
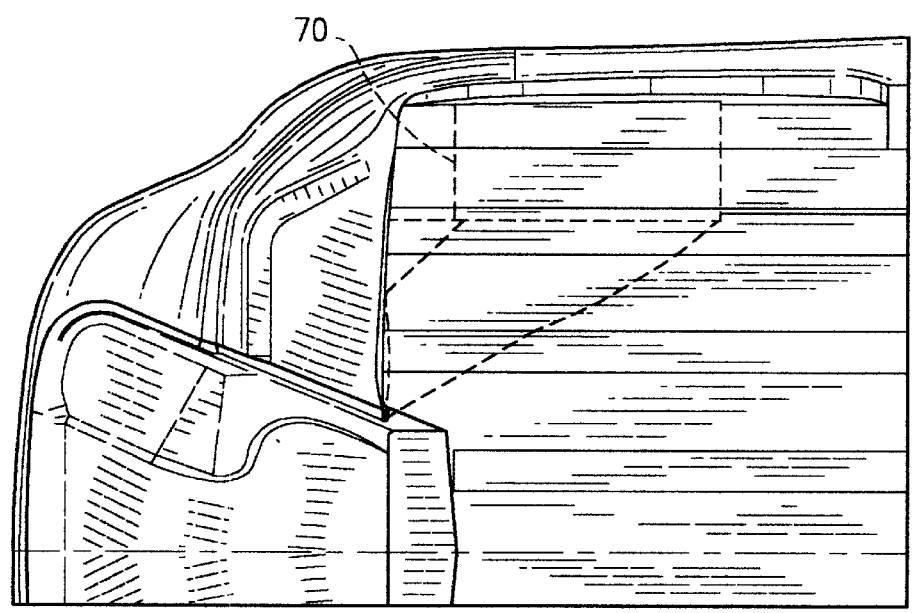
FIG. 11 is a partial, bottom view, illustrating the aft section of a modified hull incorporating the instant invention.

FIG. 11 illustrates the water channel 70, in dotted lines, which defines the internal channel within the hull, through which the water flows.

Figure 13:
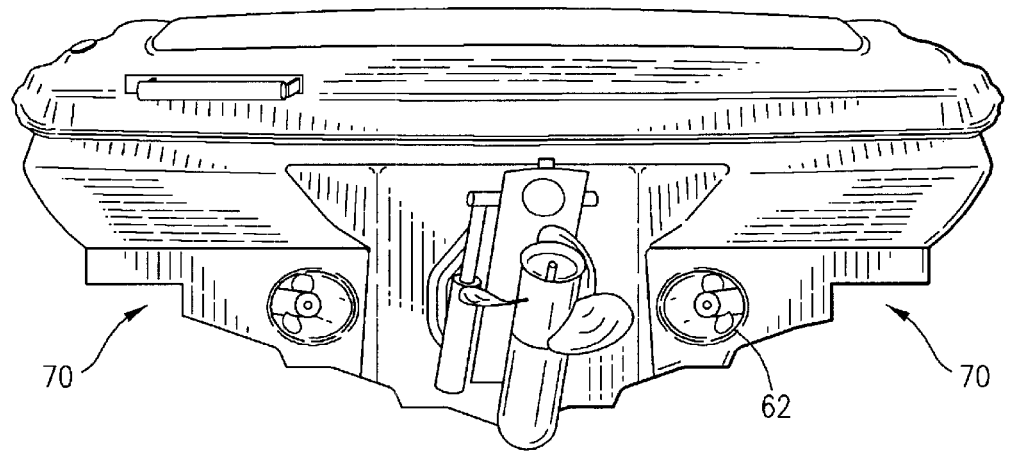
FIG. 13 is a rear view of a boat, incorporating a modified hull including the instant invention.

As briefly addressed above, FIG. 12 depicts a rear view of a conventional boat hull, including a V-shaped hull. In contrast thereto, FIG. 13 illustrates a modified hull, and the substantial hull structure which was required to be removed in order to incorporate the extended strake face, chine surfaces, and offsets, generally shown in direction 70.

FIG. 14 was mentioned above partially in conjunction with conventional strakes and planar sections in the forward or bow section of the boat, as well as along the periphery of the hull, and provides a bottom view.

Figure 15:
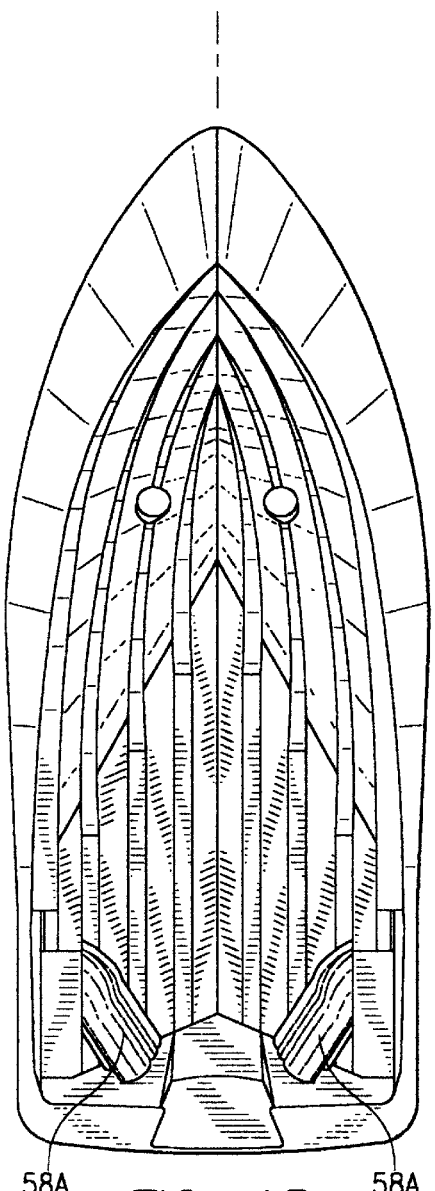
FIG. 15 is a top plan view, illustrating a modified hull incorporating the instant invention.

FIG. 15 is a top plan view of a modified hull as described herein, and illustrates a pair of tunnel means 58A, on both the starboard and port sides of the hull, the general symmetry of the design and angular offsets with respect to the centerline of the hull, and overall dimensional relationship to both the length and beam of the vessel.

In low speed operations, such as when first moving from a static position, in docking maneuvers, or the like, the hull of the boat sits in a body of water and the surface water is generally at or about the chine surface. The modified hull described in detail herein provides a pair of thruster tunnels located in the aft section of the boat, which are totally submerged beneath the surface. This is achieved through designing the tunnel inlet orifices such that they are defined by a substantially enlarged vertical strake surface, which is itself located in a lowered position about the rear of the hull, below the lowermost chine line. The tunnel inlet is also offset substantially, in an inboard direction, such that the tunnel remains submerged when the aft thrusters are actuated, and the propellers are operating to move water through the tunnels and provide the desired thrust. The design eliminates ventilation through the tunnel by preventing the introduction of atmospheric air into the internal hull chambers. When operating at low speeds, when the boat is not on plane, this is the desired condition, as the propellers will provide maximum power and water movement through the tunnels, and therefore, maximum thrust.

It is of course desired and important to have only water present within the tunnels to allow maximum efficiency of the props. If ambient air is present in the tunnel, this can create propeller cavitation, allowing the motors and propellers to operate in no load conditions which can result in damage to the propeller or burnt-out motors.

There are conventional propulsion systems available in the marine industry which provide for the precision handling and maneuverability of watercraft. These include mechanical, electro-mechanical, hydraulic, and hybrid systems which provide for the complete control and selective operation of one or more thrusters. For example, servo controls allow the operator to simultaneously provide equal power to the dual aft thrusters or, alternatively, select one or the other in order to impart movement to the boat in the desired direction. These systems are generally known in the prior art, and their teachings are incorporated herein by reference. The optimum tunnel design, and the modifications to the hulls as taught, described, and claimed herein, can be used with respect to any of the propulsion systems available in the marine industry. As will be appreciated by one of ordinary skill in this technology, it is well known as to how to mount thrusters within the tunnel channels, including appropriately dimensioned propellers, shaft assemblies, and the required mechanical and electrical control systems. One or more thrusters and associated channels can also be incorporated into the bow of a boat, and such forward thrusters can be, if desired, utilized in conjunction with the instant invention. It is envisioned that any such systems can be utilized in a hull which is modified in accordance with the structural design features illustrated in these drawings, and described in this specification.

It will be seen that the objects set forth above, and those made apparent from the foregoing description, are efficiently attained and certain changes may be made in the above construction without departing from the scope of the invention. It is intended that all matters contained in the foregoing description or shown in the accompanying drawings shall be interpreted as illustrative, and not in a limiting sense.

The instant invention has been shown and described herein in what is considered to be the most practical and preferred embodiment, and alternative embodiments thereof. It is recognized, however, that departures may be made therefrom within the scope of the invention and that obvious modifications will occur to a person skilled in the art.

What is claimed is:

1. A modified boat hull, the hull including opposing sides, a transom and chine, providing non-ventilating aft thruster tunnels, comprising:

said chine being a vertical surface and defining a lowermost chine line;

strake means for providing water inlet from a hull side;

an enhanced and inboard chine offset, intersecting said strake means, comprising a generally horizontal transverse planar surface, elongated in length and width and further providing a recessed, protective partial enclosure for said strake means;

said chine offset generally located at or below said chine line;

said strake means located below said chine;

said strake means being fully submerged when said hull is stationary in water;

transom means for providing water outlet;

tunnel means for providing a water channel through said hull, said tunnel means interfacing and fluidly communicating with said strake means and said transom means;

said tunnel means further for receiving and mounting an aft thruster;

whereby, when said hull is placed in a body of water, said hull tunnels are submerged below the water line, eliminating atmospheric air ingestion into said tunnels when said boat is stationary or moving at below plane speed.

2. The modified boat hull as set forth in claim 1, wherein said chine further comprises chine step means for providing air intake upon acceleration of said hull, when a boat is approaching, or exceeding, plane speed.

3. The modified boat hull as set forth in claim 2, wherein said chine step means constitutes a vertical offset, and a tapered planar surface extending from said vertical offset, rewardly toward said transom.

4. The modified boat hull as set forth in claim 1, wherein said strake means constitutes an extended vertical planar surface, elongated in length and width, and includes an opening for fluid communication with said tunnel means.

5. The modified boat hull as set forth in claim 1, further comprising an inboard offset for said strake means.

6. The modified boat hull as set forth in claim 1, further comprising:

chine wedge means for deflecting water flow about said hull.

7. The modified boat hull as set forth in claim 6, wherein said chine wedge constitutes an outwardly flared external surface, located forward said chine.

8. The modified boat hull as set forth in claim 1, wherein said tunnel means includes a generally tubular section, and a generally converging transition section, said tubular section fluidly communicating at one end with said transom means, and fluidly communicating at the opposing end with said converging transition section, said converging transition section fluidly communicating at its opposite end with said strake means.

9. The modified boat hull as set forth in claim 8, wherein said tunnel means is angularly positioned approximately 35 degrees from said hull centerline.

10. A modified boat hull, the hull including opposing sides, a transom and chine, providing dual, non-ventilating aft thruster tunnels, each said tunnel comprising:

said chine being a vertical surface and defining a lowermost chine line;

an enhanced, vertical strake planar surface, elongated in length and width, and including an opening for fluid communication and providing water inlet from a side of the hull, entering said tunnel;

an enhanced and inboard chine offset, intersecting said vertical strake surface, comprising a generally horizontal transverse planar surface, elongated in length and width, further providing a recessed, protective partial enclosure for said vertical strake surface;

said chine offset generally located at or below said chine line;

said vertical strake surface generally located below said chine, said vertical strake surface being fully submerged when said hull is stationary in water;

a transom orifice for providing water outlet;

said tunnel including a first, generally tubular section, and a second converging transition tunnel section, said tubular section interfacing and being in fluid communication at one end with said transom orifice, said tubular section in fluid communication with said converging transition section at its opposing end;

said converging transition section terminating and being in fluid communication with said vertical strake surface at its opposite end;

whereby, when said hull is placed in a body of water, said hull tunnels are submerged below the water line, eliminating atmospheric air ingestion into said tunnels when said boat is stationary or moving below plane speed.

11. The modified boat hull as set forth in claim 10, further comprising a chine step, said chine step including a vertical offset, and a tapered planar surface extending from said vertical offset, rearwardly toward said transom.

12. The modified boat hull as set forth in claim 10, further comprising an inboard, planar offset for said vertical strake surface.

13. The modified boats hull as set forth in claim 10, wherein said dual tunnels are generally symmetrical, and positioned approximately 35 to 40 degrees from said hull center line.

* * * * *